Oct. 23, 1962  H. KRASNY  3,059,527
MOTION PICTURE PROJECTOR
Filed March 25, 1960  6 Sheets-Sheet 1

INVENTOR
HUBERT KRASNY
BY J. Albert Hultquist
ATTORNEY

Oct. 23, 1962 H. KRASNY 3,059,527
MOTION PICTURE PROJECTOR
Filed March 25, 1960 6 Sheets-Sheet 2

INVENTOR
HUBERT KRASNY
BY
ATTORNEY

Oct. 23, 1962           H. KRASNY           3,059,527

MOTION PICTURE PROJECTOR

Filed March 25, 1960           6 Sheets-Sheet 3

INVENTOR
HUBERT KRASNY
BY
ATTORNEY

Oct. 23, 1962

H. KRASNY 3,059,527

MOTION PICTURE PROJECTOR

Filed March 25, 1960

INVENTOR
*HUBERT KRASNY*
BY
ATTORNEY

Oct. 23, 1962          H. KRASNY          3,059,527

MOTION PICTURE PROJECTOR

Filed March 25, 1960          6 Sheets-Sheet 5

INVENTOR
HUBERT KRASNY
BY
ATTORNEY

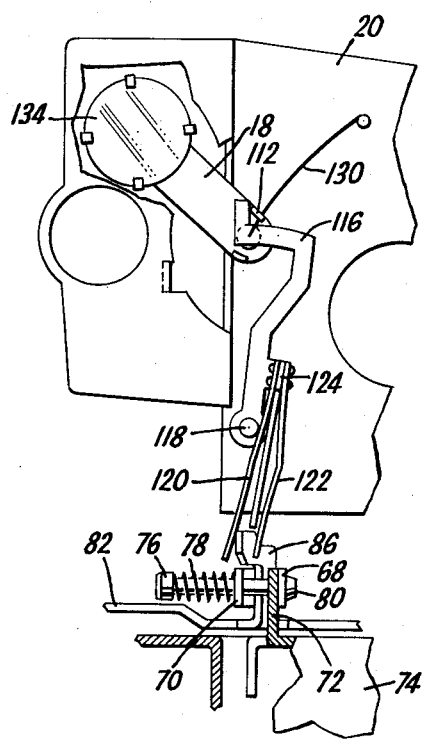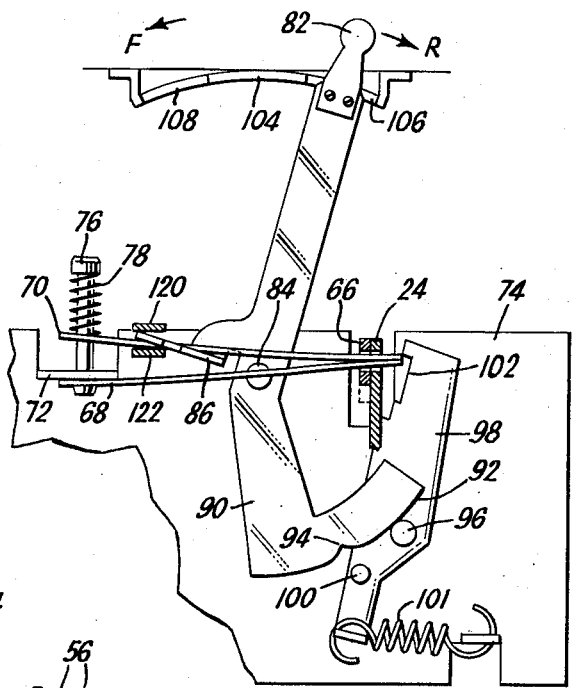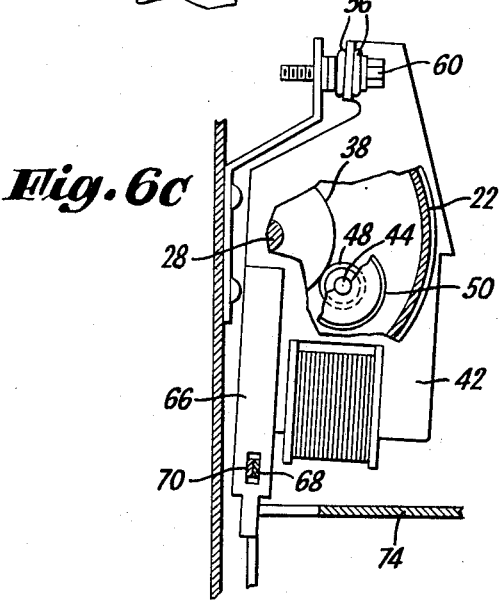

United States Patent Office 3,059,527
Patented Oct. 23, 1962

3,059,527
MOTION PICTURE PROJECTOR
Hubert Krasny, Ann Arbor, Mich., assignor, by mesne assignments, to Argus Incorporated, a corporation of Delaware
Filed Mar. 25, 1960, Ser. No. 17,584
6 Claims. (Cl. 88—17)

The present invention relates to motion picture projectors and, more particularly, to a novel, compact arrangement of a motor drive structure by means of which the film is fed through the projector and the shutter mechanism is actuated.

The present invention contemplates an efficiently organized, mechanically simple, easily assembled and repaired combination of motion picture projector elements wherein a single motor is mounted to efficiently actuate the film moving parts through a simple friction drive arrangement for either forward or reverse motion of the film and to also actuate the cooling system whereby the temperature of the lamp and of the film passing through the film gate are maintained within reasonable limits. Furthermore, the arrangement is rigid, assembled in a balanced relationship on a vertical mounting plate and has all of the mechanical parts compactly arranged but in accessible locations.

An object of the present invention is to provide a simple, reliable drive train between an electric motor in a film projector and the mechanical devices driven thereby.

Another object of the present invention is the elimination to as great an extent as possible of belt and/or gear drives.

Another object of the present invention is the provision of a readily reversible drive for motion picture projectors.

Still another object of the present invention is the provision of a motor drive for motion picture projectors which will be quiet in operation and simple and reliable.

The foregoing objects, and others which may appear from the following detailed description, are attained in accordance with the principles of the present invention by providing, on the longitudinal main drive shaft of the projector, a shutter wheel having a pair of drive rims, one on the extreme periphery of the shutter disc and the other, somewhat smaller in diameter, within the outer drive rim and spaced therefrom a radial distance at least equal to the size of the shutter openings in the disc. The drive shaft of the motor extends between the two rims and has mounted thereon a pair of concentric friction drive rollers. By swinging the motor as a whole laterally with respect to the axis of rotation of the shutter disc, one of the friction drive rollers may be moved into engagement with the interior surface of the outer rim to drive the projector in one direction. Alternatively, if the motor is swung in the other direction the other of the friction drive rollers contacts the exterior surface of the inner drive rim, thus driving the projector in the reverse direction.

The ratios of the two drive rollers to the driving rims which they engage are so related that the speed of rotation of the main shaft is essentially the same in both the forward and reverse directions of drive. Thus, no matter in which direction the projector is run, the motion displayed on the screen is in correct tempo. A "heat screen" is arranged to drop into the optical path from the projector lamp to the film gate when the motor is shifted into its intermediate position where neither of the drive rollers contacts its associated driving rim to prevent the possibility of the heat from the lamp burning or scorching the stationary film in the film gate.

A more complete understanding of the present invention will be had by reference to the following detailed description which is accompanied by a drawing in which:

FIGURES 6a, 6b and 6c are similar to FIGURES 5a, 5b, and 5c but showing the mechanism in the operative position for reverse drive of the mechanism.

Figure 1:
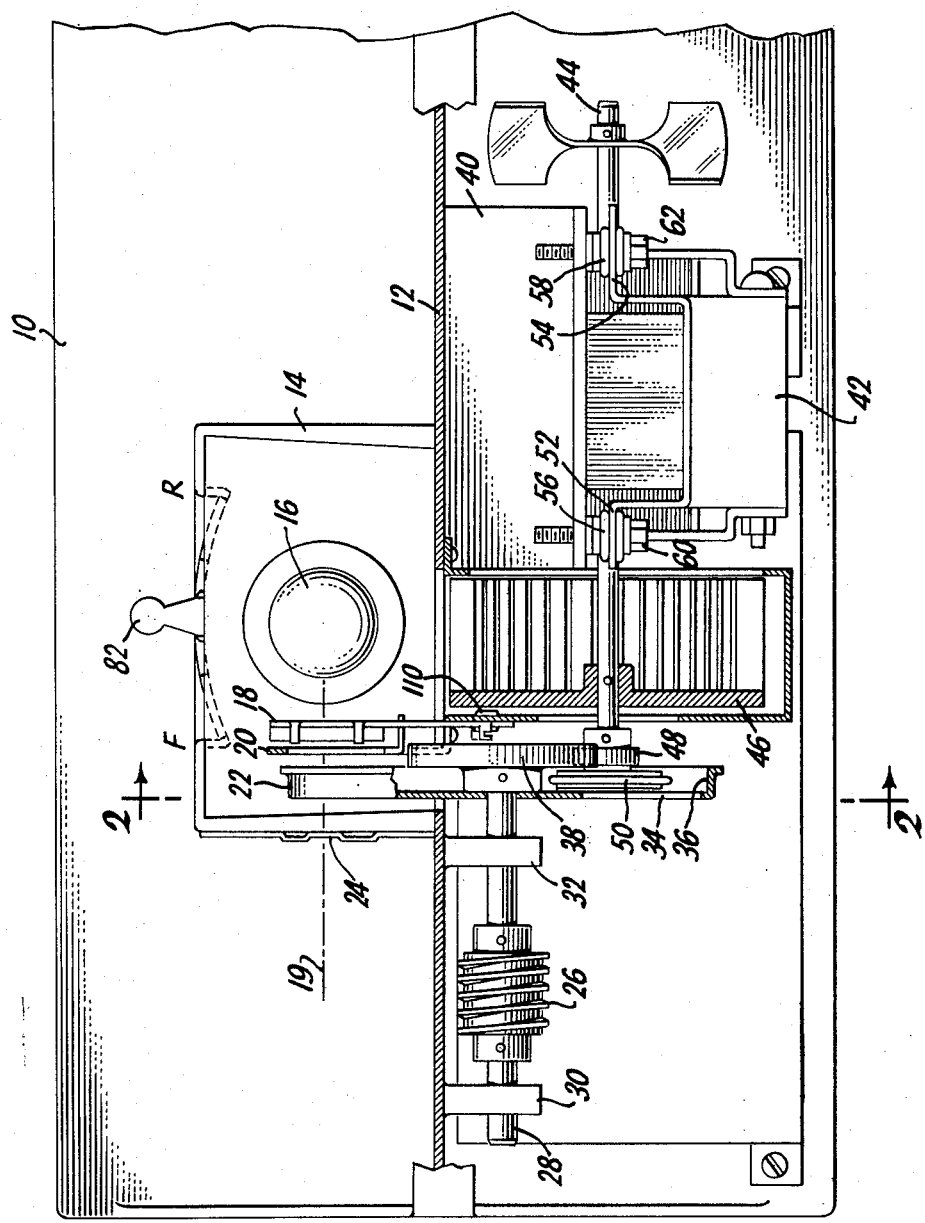
FIGURE 1 is a horizontal cross-sectional view of a motion picture projector embodying principles of the present invention.

Referring now to FIGURE 1 there is shown the main base plate 10 of the projector which has a central vertically extending mounting partition plate 12 upon which most of the operating parts are mounted. On one side of the vertical mounting plate 12 is mounted a lamp housing 14 encasing projection lamp 16 which provides the source of light for projecting the pictures. Along the optical axis of the projection system in sequence from lamp 16 are mounted heat screen 18, mask 20, shutter 22 and film gate 24. The projection lens and the detailed elements of the film feed mechanism are not shown in this figure since they are not necessary to an understanding of the operation of the present invention. However, the film feed sprockets which provide for uniform feed of the film from the supply reel to the take-up reel are driven from worm wheel 26, carried by main drive shaft 28 journalled in bearings 30, 32. Main drive shaft 28 also carries at its rear end shutter disc 22. Shutter disc 22 is provided with appropriate number of shutter openings 34 which pass in succession across the optical axis 19 allowing light from lamp 16 to reach the film in film gate 24 only during time periods when the film is stationary. The light is occulted by the solid portions of shutter disc 22 when the film is in motion moved stepwise one frame at a time by a feed claw (not shown) actuated by a cam on shaft 28. Shutter disc 22 has an upstanding drive rim 36, the inner surface of which is ground or otherwise machined to be truly concentric with the axis of shaft 28. Mounted immediately back of shutter disc 22 is a supplemental drive wheel 38 having a drive rim, the outer surface of which is truly concentric with the axis of shaft 28 and outer rim 36. Vertical mounting plate 12 on the side remote from lamp housing 14 carries a laterally extending bracket 40 on which is resiliently mounted the frame of motor 42. Shaft 44 of motor 42 extends both to the front and to the rear of motor 42 and at its front end has rigidly secured thereto in sequence a fan 46, which supplies a current of cooling air to the lamp 16 and to the film in film gate 24, and a pair of friction drive rollers 48, 50. Drive rollers 48 and 50 are provided with resilient tires of heat resistant rubber or other high friction material ground to be truly concentric with the axis of shaft 44. The diameters of drive rollers 48 and 50 are so related to the diameters of rims 38 and 36 that the resultant speed of shaft 28 as driven by motor 42 is the same whether roller 48 is in contact with driving rim 38 or roller 50 is in contact with driving rim 36, the only difference being the direction of rotation of the shaft.

Figure 3:
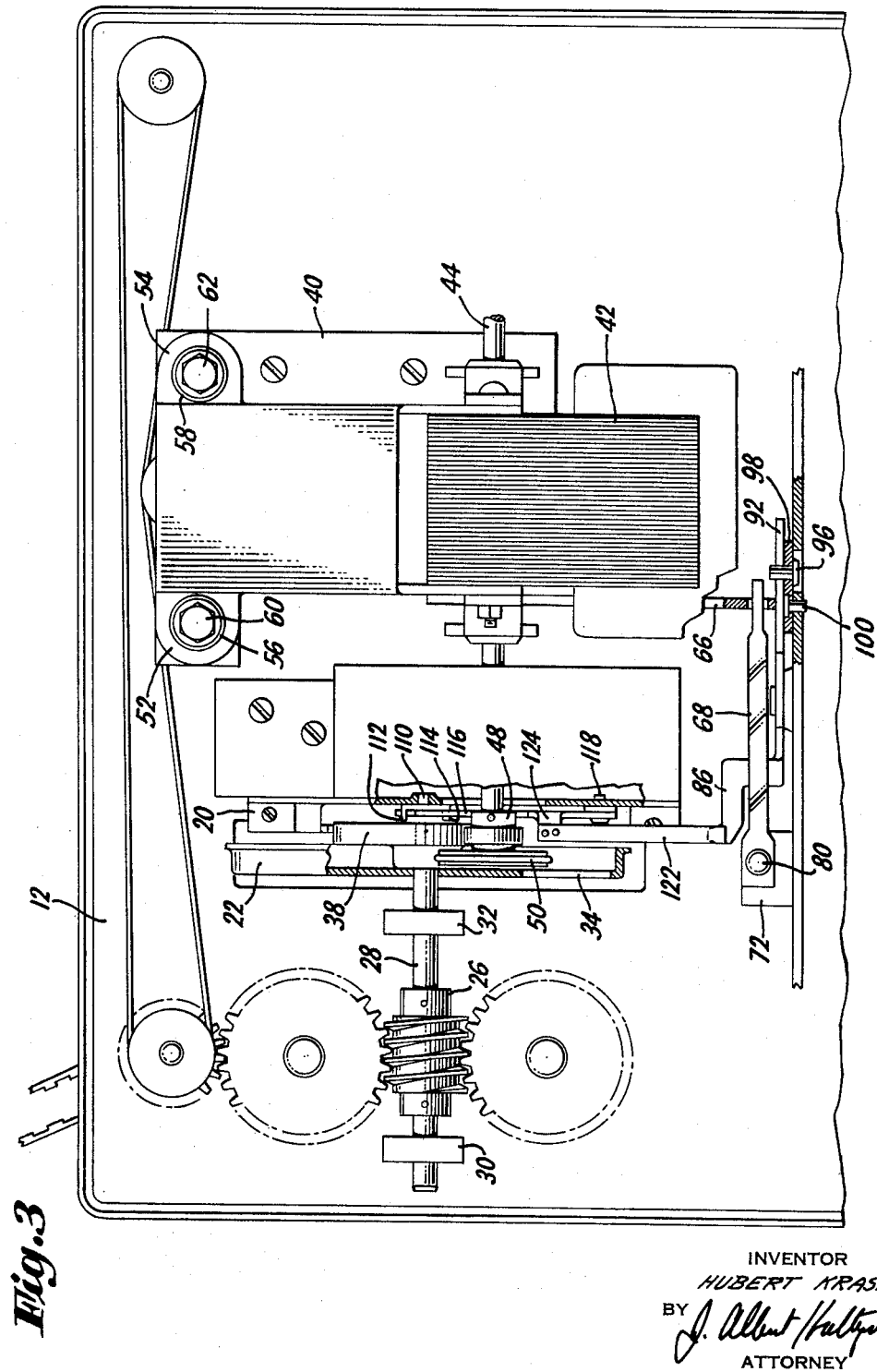
FIGURE 3 is a side elevational view of the central mounting plate of the projector with the back casing removed and some of the parts in fragmentary section in order to more clearly show features of the present invention.

Motor 42 is provided at its upper end with supporting ears or brackets 52, 54 into which are mounted rubber grommets 56, 58. Mounting screws 60, 62 pass through the rubber grommets and are threadedly secured into mounting bracket 40. Due to the resiliency of the rubber grommets 56, 58, motor 42, as a whole, may be swung laterally a limited distance pivoting about the horizontal location line of the holes in brackets 52, 54. The lateral swinging movement of motor 42 is accomplished by the lateral movement of finger 66, (FIGURE 3) rigidly secured to the frame of motor 42 and extending downwardly where it is engaged by a pair of levers 68 and 70 which at one end are resiliently secured on opposite sides of tab 72 extending upwardly from mounting plate 74. A bolt 76 carrying a compression spring 78 passes through mounting holes in both levers 70 and 68 and through a mounting hole in tab 72. A snap ring 80 or a nut is placed on the free end of bolt 76 to maintain the parts in assembled relationship. Shifting lever 82 mounted on pivot pin 84 has an upstanding tab 86 interposed between fingers 68 and 70.

Figure 4:
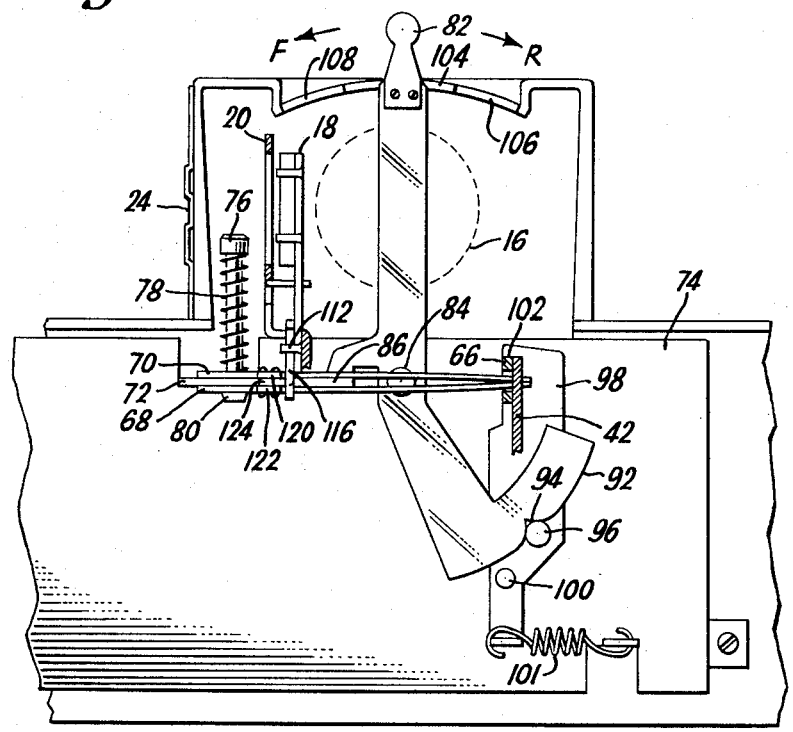
FIGURE 4 is a fragmentary plan view in section showing in more detail the actuating levers by means of which the driving motor is resiliently moved to either of its two driving positions.
Figure 7:
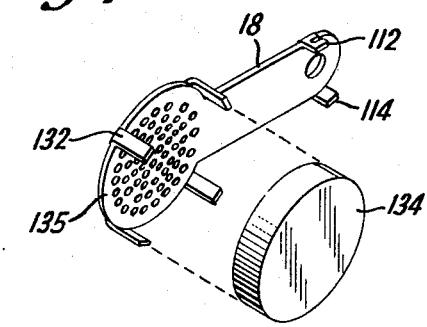
FIGURE 7 is an exploded view of the shutter showing further details of its construction.

Now, as operating lever 82 is moved in the direction indicated by the arrow F in FIGURE 4, for forward drive of the projector, tab 86 tends to move downwardly forcing lever 68 in the same direction. This moves arm 66 in the same direction and causes motor 42 to be moved outwardly so that drive roller 50 contacts the inside surface of drive rim 36, thus conditioning the machine for forward drive of the film. Since tab 86 will drive spring arm 68 further than is necessary to bring roller 50 into contact with rim 36, the excess movement will be taken up by the movement of bolt 76 (downwardly in FIGURE 4) compressing spring 78. The compression of spring 78 provides for a resilient pressure of drive roller 50 against rim 36 so that as the driving roller wears it still provides efficient driving contact. Similarly, if lever 82 is moved in the direction indicated by the arrow R in FIGURE 4 tab 86 moves in an upward direction pressing against spring lever 70 and thus moving arm 66 upwardly in FIGURE 4 and causing the motor to be shifted toward mounting plate 12.

Figure 2:
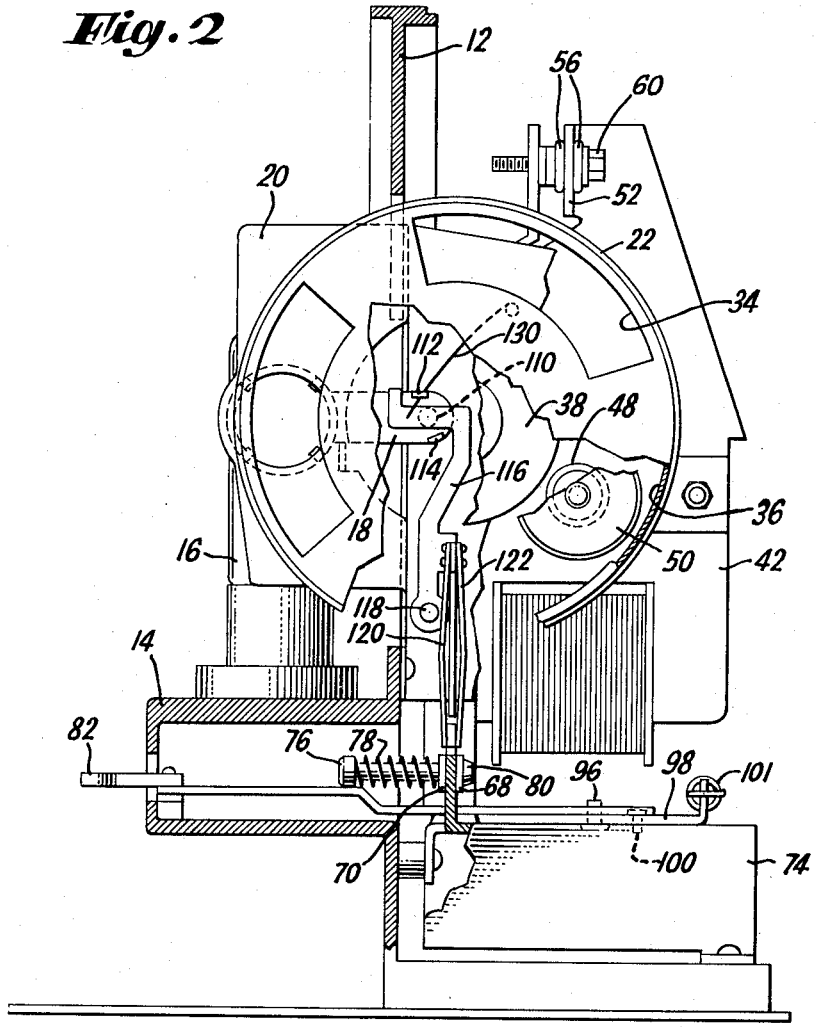
FIGURE 2 is a vertical cross-section of said projector taken along line 2—2 of FIGURE 1.
Figure 5B:
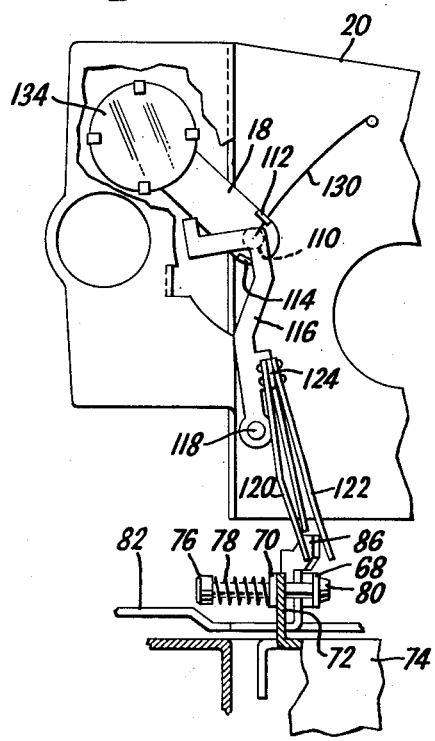
FIGURE 5b is a fragmentary view similar to FIGURE 2 but showing the motor drive means in its operative position for forward film drive.
Figure 5A:
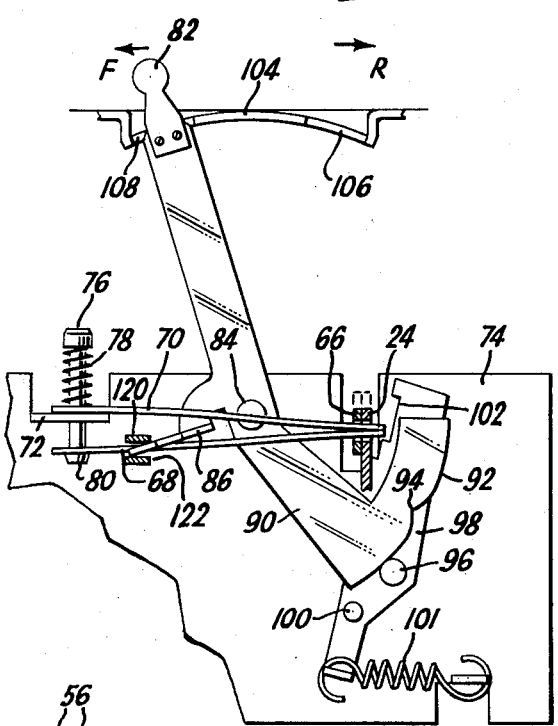
FIGURE 5a is a fragmentary view similar to FIGURE 4 but showing the actuating lever in the position for forward film drive.
Figure 5C:
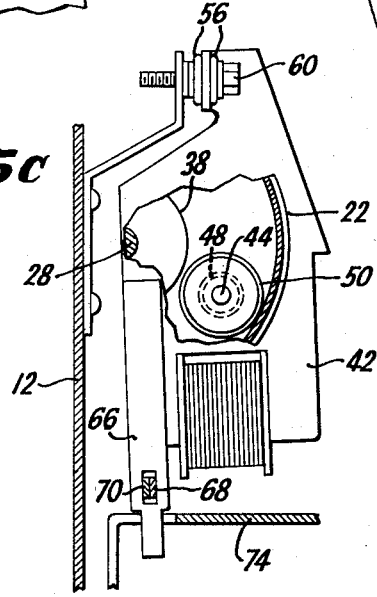
FIGURE 5c is a further vertical sectional view similar to FIGURE 2 but showing the relationship of the driving rollers with the shutter disc rims in the direction for forward film drive.

Means are provided for positively locking the motor in its idle or disengaged position. This is accomplished by a rear extension 90 on lever 82 which carries a cam arc 92 having a notch 94 at its midpoint. Pin 96 carried by locking lever 98, rides along the cam surface 92 as lever 82 is swung from one position to the other. As cam pin 96 is driven out of its position in notch 94 it tends to pivot lock bar 98 about its pivot 100 against the tension of spring 101. Moving the upper end (in FIGURE 4) to the right so that notch 102 clears the end of finger 66, allowing the finger to be moved in response to the spring pressure provided by spring arms 68 and 70. Gate 104 through which operating lever 82 protrudes at the bottom of lamp housing 14 is provided with locking notches 106 and 108 which lock operating lever in the directions of reverse and forward travel, respectively. When the motor is in its central position of rest as shown in FIGURE 2 shutter 18 normally rests in the path of the beam of light from lamp 16 to prevent excessive heat from damaging the film in film gate 24. Shutter 18 is journalled on pivot pin 110 and is provided with a pair of operating tabs 112 and 114 in diametrically opposed relationship about pivot pin 110. They are arranged to be selectively engaged by shutter operating lever 116 which is pivoted on pin 118. As operating lever 116 is moved to the left, as shown in FIGURE 5b, it tends to engage tab 114 and the shutter is pivoted about 110 and rises out of the optical path. Similarly, as shown in FIGURE 6b, when lever 116 is operated to the right its extreme end contacts tab 112 again causing the shutter to pivot about 110 in a clockwise direction, thus raising the shutter out of the optical path. The movement of shutter operating lever 116 is provided for by springs 120 and 122 rigidly secured to operating lever 116 at tab 124 by rivets, screws or other appropriate securing means. The lower ends of spring levers 120 and 122 rests on opposite sides of an upward extension of tab 86, whereby as lever 82 is moved to engage the motor drive mechanism in either forward or reverse direction of rotation, the tab presses against either spring 120 or spring 122, moving the top end of lever 116 in either a clockwise or counter-clockwise direction. In either event, the shutter is moved in a clockwise direction to clear the optical path. A light hairspring 130 mounted on a conveniently fixed mounting point on the housing provides a light spring pressure against tab 112 to assist the force of gravity in assuring that the shutter drops into its proper position at any time when the motor drive is not engaged. Shutter 18 includes a circular foraminous disc portion 135 having a plurality of glass mounting legs 132 spaced about its periphery. A circular piece of heat resistant glass 134 is secured in a face-to-face relationship with disc 135 by tabs 132 being bent over the edge of the glass. Preferably, foraminous disc 135 is highly polished on the side facing the lamp so as to reflect as much of the radiant heat of the lamp when it is in its operating position. This reduces the heat load which must be absorbed by heat absorbing glass 134. It should also be noted that glass 134 is on the side of disc 135 away from lamp 16. Thus the need for using specially tempered heat absorbing glass or taking other precautions against glass breakage is avoided.

Having now particularly described an embodiment of the present invention whereby its construction and the principles of operation may be clearly understood, what I claim as my invention is set forth in the appended claims.

I claim:

1. A motion picture projector including an optical train extending from a source of light and a film gate, a first shaft parallel to the axis of said train, said shaft carrying means for driving film feeding and film take up drives and a shutter disc, said shutter disc arranged to extend across said optical train, said shutter disc having an upstanding rim on its circumference, a driving wheel carried by said shaft and mounted concentrically within said rim, a motor having an armature shaft parallel to said first shaft and mounted for swinging movement about an axis parallel to said first shaft, said armature shaft extending between said rim and said wheel and carrying a pair of coaxial driving rollers positioned to selectively engage the inside of said rim and the outside periphery of said wheel as said motor is swung about its axis, the diameters of said rollers being so related to the inside diameter of said rim and the periphery of said wheel that said first shaft is driven at substantially the same speed in either direction of rotation.

2. A motion picture projector including an optical train extending from a source of light and a film gate, a first shaft parallel to the axis of said train, said shaft carrying means for driving film feeding and film take up drives and a shutter disc, said shutter disc arranged to extend across said optical train, said shutter disc having an upstanding rim on its circumference, a driving wheel carried by said shaft and mounted concentrically within said rim, drive shaft parallel to said first shaft and mounted for swinging movement about an axis parallel to said first shaft, said drive shaft extending between said rim and said wheel and carrying a pair of coaxial driving rollers positioned to selectively engage the inside of said rim and the outside periphery of said wheel as said shaft is swung about its axis, the diameters of said rollers being so related to the inside diameter of said rim and the periphery of said wheel that said first shaft is driven at substantially the same speed in either direction of rotation.

3. A motion picture projector including an optical train extending from a source of light, and a film gate, a supporting frame, a first shaft parallel to the axis of said train journalled on said frame, said shaft carrying means for driving film feeding and film take up drives and a shutter disc, said shutter disc arranged to extend across said optical train, said shutter disc having an upstanding rim on its circumference, a driving wheel carried by said shaft and mounted concentrically within said rim, a motor having an armature shaft parallel to said first shaft and mounted for swinging movement on said frame about an axis parallel to said first shaft, said armature shaft extending between said rim and said wheel and carrying a pair of coaxial driving rollers positioned to selectively engage the inside of said rim and the outside periphery of said wheel as said motor is swung about its axis, the diameters of said rollers being so related to the inside diameter of said rim and the periphery of said wheel that said first shaft is driven at substantially the same speed in either direction of rotation.

4. A motion picture projector including an optical train extending from a source of light, and a film gate, a supporting frame, a first shaft parallel to the axis of said train journalled on said frame, said shaft carrying means for driving film feeding and film take up drives and a shutter disc, said shutter disc arranged to extend across said optical train, said shutter disc having an upstanding rim on its circumference, a driving wheel carried by said shaft and mounted concentrically within said rim, a motor having an armature shaft parallel to said first shaft and mounted for swinging movement on said frame about an axis parallel to said first shaft, said armature shaft extending between said rim and said wheel and carrying a pair of coaxial driving rollers positioned to selectively engage the inside of said rim and the outside periphery of said wheel as said motor is swung about its axis, the diameters of said rollers being so related to the inside diameter of said rim and the periphery of said wheel that said first shaft is driven at substantially the same speed in either direction of rotation, means for swinging said motor including a pair of parallel spring arms engaging an arm on said motor and resiliently coupled to said frame, a shift lever journalled on said frame and having a drive finger extending between said spring arms whereby said motor is resiliently urged in directions so that said drive rollers yieldingly engages either said rim or said wheel as said shift lever is selectively moved to the ends of its arc of movement.

5. A motion picture projector including an optical train extending from a source of light, and a film gate, a supporting frame, a first shaft parallel to the axis of said train journalled on said frame, said shaft carrying means for driving film feeding and film take up drives and a shutter disc, said shutter disc arranged to extend across said optical train, said shutter disc having an upstanding rim on its circumference, a driving wheel carried by said shaft and mounted concentrically within said rim, a motor having an armature shaft parallel to said first shaft and mounted for swinging movement on said frame about an axis parallel to said first shaft, said armature shaft extending between said rim and said wheel and carrying a pair of coaxial driving rollers positioned to selectively engage the inside of said rim and the outside periphery of said wheel as said motor is swung about its axis, means for swinging said motor including a pair of parallel spring arms engaging an arm on said motor and resiliently coupled to said frame, a shift lever journalled on said frame and having a drive finger extending between said spring arms whereby said motor is resiliently urged in directions so that said drive rollers yieldingly engage either said rim or said wheel as said shift lever is selectively moved to the ends of its arc of movement, said lever including a cam section having a detent in its central portion representing a disengaged position of said motor, a latch bar pivoted on said frame and carrying a follower adapted to engage said detent, said latch bar further having a locking notch adapted to engage said arm whereby said motor is locked in said disengaged position.

6. A motion picture projector including an optical train extending from a source of light and a film gate, a supporting frame, a first shaft parallel to the axis of said train journalled on said frame said shaft carrying means for driving film feeding and film take up drives and a shutter disc, said shutter disc arranged to extend across said optical train, said shutter disc having an upstanding rim on its circumference, a driving wheel carried by said shaft and mounted concentrically within said rim, a motor having an armature shaft parallel to said first shaft and mounted for swinging movement on said frame about an axis parallel to said first shaft, said armature shaft extending between said rim and said wheel and carrying a pair of coaxial driving rollers positioned to selectively engage the inside of said rim and the outside periphery of said wheel as said motor is swung about its axis, the diameters of said rollers being so related to the inside diameter of said rim and the periphery of said wheel that said first shaft is driven at substantially the same speed in either direction of rotation, means for swinging said motor including a pair of parallel spring arms engaging an arm on said motor and resiliently coupled to said frame, a shift lever journalled on said frame and having a drive finger extending between said spring arms whereby said motor is resiliently urged in directions so that said drive rollers yieldingly engage either said rim or said wheel as said shift lever is selectively moved to the ends of its arc of movement, said lever having a cam section having a central detent corresponding to the central disengaged position of said motor, a latch bar pivoted on said frame and carrying a follower adapted to engage said detent said latch bar further having a locking notch adapted to engage said arm whereby said motor is locked in said disengaged position.

References Cited in the file of this patent

UNITED STATES PATENTS

| | | |
|---|---|---|
| 1,982,739 | Kaden et al. | Dec. 4, 1934 |
| 2,196,738 | Nagel | Apr. 9, 1940 |
| 2,668,059 | Roberts | Feb. 2, 1954 |
| 2,874,369 | Blain et al. | Feb. 17, 1959 |